US010379848B2

(12) United States Patent
Chee et al.

(10) Patent No.: US 10,379,848 B2
(45) Date of Patent: *Aug. 13, 2019

(54) CROSS-VALIDATION BASED CODE FEATURE TAGGING

(71) Applicant: INTERNATIONAL BUSINESS MACHINES CORPORATION, Armonk, NY (US)

(72) Inventors: Yi-Min Chee, Yorktown Heights, NY (US); Hao Chen, Beijing (CN); Ya Bin Dang, Beijing (CN); Shao Chun Li, Beijing (CN); Guang Tai Liang, Beijing (CN); Li Jun Mei, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,846

(22) Filed: Feb. 20, 2018

(65) Prior Publication Data

US 2018/0173523 A1    Jun. 21, 2018

Related U.S. Application Data

(63) Continuation of application No. 14/875,345, filed on Oct. 5, 2015, now Pat. No. 9,952,857.

(51) Int. Cl.
*G06F 8/41*    (2018.01)
*G06F 8/71*    (2018.01)
*G06F 8/73*    (2018.01)

(52) U.S. Cl.
CPC ............... *G06F 8/73* (2013.01); *G06F 8/433* (2013.01); *G06F 8/71* (2013.01)

(58) Field of Classification Search
CPC .................................... G06F 8/71; G06F 8/73
USPC .................................................. 717/121, 123
See application file for complete search history.

(56) References Cited

U.S. PATENT DOCUMENTS

| 7,831,608 B2 | 11/2010 | Aizenbud-Reshef et al. |
| 8,307,339 B2 | 11/2012 | Sundararajan et al. |
| 8,640,088 B2 | 1/2014 | Hamlton, II et al. |
| 2003/0225774 A1* | 12/2003 | Davidov ............... G06F 8/30 |
| 2014/0282403 A1 | 9/2014 | Frenkiel |

OTHER PUBLICATIONS

Anvik et al., "Task Articulation in Software Maintenance: Integrating Source Code Annotations with an Issue Tracking System" (Year: 2008).*

Fang et al., "Towards Automatic Tagging for Web Services" (Year: 2012).*

(Continued)

*Primary Examiner* — Phillip H Nguyen
(74) *Attorney, Agent, or Firm* — Tutunjian & Bitetto, P.C.; Grant Johnson (57) ABSTRACT

Method and systems for tagging code include organizing code units in a hierarchical structure that associates the code units with respective description units. The hierarchical structure is filtered to remove un-meaningful description units from the hierarchical structure. Feature tags are generated based on a weighted sum of term frequencies in the description units of the hierarchical structure to associate features with respective code units.

20 Claims, 5 Drawing Sheets

(56) References Cited

OTHER PUBLICATIONS

Heymans et al., "A code tagging approach to software product line development" (Year: 2012).*
List of IBM Patents or Patent Applications Treated as Related dated Feb. 20, 2018, 2 pages.
Abebe, S.L. et al., "Natural Language Parsing of Program Element Names for Concept Extraction," Proceedings of the 2010 IEEE 18th International Conference on Program Comprehension, Jun. 2010. (pp. 156-159).
Bonnet, J. et al., "Analyzing Dynamic Call Graphs Enhanced with Program State Information for Feature Location and Understanding," Companion of the 30th international conference on Software engineering, May 2008. (pp. 915-916).
Chen, A. et al., "CVSSearch: Searching through Source Code using CVS Comments," Proceedings of the IEEE International Conference on Software Maintenance, Nov. 2001. (pp. 1-10).
Chen, K. et al., "Case Study of Feature Location Using Dependence Graph," Proceedings of the 8th International Workshop on Program Comprehension, Jun. 2000. (pp. 241-249).
Cubranic, D. et al., "Hipikat: A Project Memory for Software Development," IEEE Transactions on Software Engineering, vol. 31, No. 6, Jun. 2005. (pp. 446-465).
Dit, B. et al., "Feature Location in Source Code: A Taxonomy and Survey," Journal of Software Maintenance and Evolution: Research and Practice, Jan. 2011.
Eddy, B.P. et al., "Supporting Feature Location and Mining of Software Repositories on the Amazon EC2," Proceedings of the 51st ACM Southeast Conference, Apr. 2013. (pp. 1-5).
Hill, E. et al., "Automatically Capturing Source Code Context of NL-Queries for Software Maintenance and Reuse," IEEE 31st International Conference on Software Engineering, May 2009. (pp. 232-242).
Koschke, R. et al., "On Dynamic Feature Location," Proceedings of the 20th IEEE/ACM international Conference on Automated software engineering, Nov. 2005. (pp. 86-95).

Olszak, A., "Remodularizing Java programs for improved locality of feature implementations in source code," Science of Computer Programming, vol. 77, Issue 3, Mar. 2012. (pp. 1-21).
Peng, X. et al., "Iterative Context-Aware Feature Location (NIER Track)," 33rd International Conference on Software Engineering (ICSE), May 2011. (pp. 900-903).
Petrenko, M. et al., "Partial Domain Comprehension in Software Evolution and Maintenance," The 16th IEEE International Conference on Program Comprehension, Jun. 2008. (pp. 13-22).
Ratanotayanon, S. et al., "Using Transitive Changesets to Support Feature Location," Proceedings of the IEEE/ACM international conference on Automated software engineering, Sep. 2010. (pp. 341-344).
Robillard, M.P., "Automatic Generation of Suggestions for Program Investigation," Proceedings of the 10th European software engineering conference held jointly with 13th ACM SIGSOFT international symposium on Foundations of software engineering, Sep. 2005. (pp. 11-20).
Robillard, M.P. et al., "Concern Graphs: Finding and Describing Concerns Using Structural Program Dependencies," Proceedings of the 24th International Conference on Software Engineering, May 2002. (pp. 406-416).
Shao, P. et al., "Feature Location by IR Modules and Call Graph," Proceedings of the 47th Annual Southeast Regional Conference, Mar. 2009. (pp. 1-4).
Shepherd, D. et al., "Towards Supporting On-Demand Virtual Remodularization Using Program Graphs," Proceedings of the 5th international conference on Aspect-oriented software development, Mar. 2006. (pp. 3-14).
Walkinshaw, N. et al., "Feature Location and Extraction using Landmarks and Barriers," IEEE International Conference on Software Maintenance, Oct. 2007. (pp. 54-63).
Wang, J. et al., "Improving Feature Location Practice with Multi-faceted Interactive Exploration," Proceedings of the 2013 International Conference on Software Engineering, May 2013. (pp. 762-771).
Zhao, W. et al., "SNIAFL: Towards a Static Non-Interactive Approach to Feature Location," Proceedings. 26th International Conference on Software Engineering. May 2004. (pp. 1-11).

* cited by examiner

CROSS-VALIDATION BASED CODE FEATURE TAGGING

BACKGROUND

Technical Field

The present invention relates to code tagging and, more particularly, to identifying source code that corresponds to particular functionality or features.

Description of the Related Art

Code tagging provides an explicit association between a given function or feature of a program and the specific source code that implements the feature. Code tagging thereby aids in debugging, as a problem with a particular feature can rapidly be localized to specific regions of code, as well as future development, as new features or improvements can be more readily introduced if one can quickly find the appropriate point in the source code to add them.

Existing code tagging techniques are relatively limited in scope, focusing only on specific types of information to determine code tagging. For example, dynamic tagging uses natural language queries, feature-relevant scenarios, and feature-irrelevant scenarios with the source code and execution traces to identify frequent code portions in traces of feature-specific scenarios. The dynamic tagging approach has a high overhead and produces false negatives. Static tagging, meanwhile, is based on natural language queries to find program dependencies, concern graphs, and structural information. Static tagging produces false positives.

SUMMARY

A method for tagging code includes organizing code units in a hierarchical structure that associates the code units with respective description units. The hierarchical structure is filtered to remove un-meaningful description units from the hierarchical structure. Feature tags are generated based on a weighted sum of term frequencies in the description units of the hierarchical structure to associate features with respective code units.

A feature tagging system includes a hierarchical structure generation module configured to organize code units in a hierarchical structure that associates code units with respective description units. A refinement module is configured to filter the hierarchical structure to remove un-meaningful description units from the hierarchical structure. A feature tag module includes a processor configured to generate feature tags based on a weighted sum of term frequencies in the description units of the filtered hierarchical structure to associate features with respective code units.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention automatically tag source code relating to specific features based on information from multiple different sources at different levels of granularity. Toward this end, the present embodiments build a Code structure based Description unit Association Model (CDAM) to provide cross-validation among different information sources. The present embodiments thereby provide an association between "business level features" that are human recognizable to "code level components" that form the inner workings of the program.

The CDAM uses a multi-layer code structure for annotation. In this structure, a code unit A is said to "contain" a code unit B if B is a part of A. The CDAM also includes description units. A description unit C is said to be "associated" with a code unit C if a description unit C is used to describe the code unit A. Description units may represent, for example, comments in the source code or other forms of documentation. Each description unit may have a weight value to indicate its relevance to its associated code unit.

Code unit types can be flexibly adjusted based on specific projects under analysis. For example, code units may have the type, "Organization," "Project," "Class Unit," "Method Unit," or "Callee Method Unit." Each type represents a level in a code hierarchy. Multiple types of description unit are associated with their relevant code units. Description unit types can be flexibly adjusted and extended based on specific projects under analysis (e.g., by the availability of information sources in each project). Description units may have, for example, the type, "code information," "code comment," "commit log," "work item description," "use case," "project description," and others. A "work item" in this context refers to, e.g., a specific piece of development work. For example, work items may include adding a new feature, fixing a defect, etc. A work item can be associated with one or more code commits.

Based on the relationships between code units and description units, the layered CDAM generates feature tags for each code unit based on cross-validation (e.g., among its associated description units) and on the impact of the code units neighbors (e.g., a code unit from a higher or lower layer).

Figure 1:
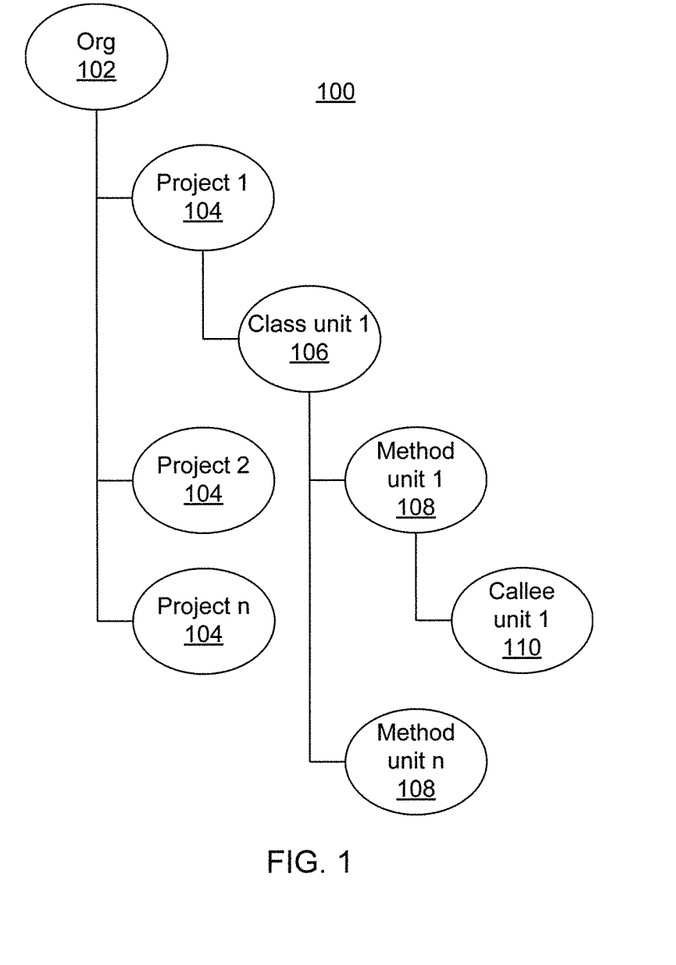
FIG. 1 is a diagram of a code structure based description unit association in accordance with the present principles.

Referring now to FIG. 1, an exemplary CDAM 100 is shown. The CDAM includes a hierarchy of code units. The top level, the organization code unit 102, contains a set of different project code units 104. Each project code unit 104 contains one or more class units 106, which in turn contain one or more method units 108, and the method units 108 include one or more callee method units 110. This branching hierarch tree provides relationships between the different code units, and these relationships can be leveraged to tag code in a particular code unit using information from across multiple, or even all, of the layers. In addition, each of the code units is associated with one or more description units.

For example, a method unit 108 may have a set of different types of description units, including code info, code comments, commit logs, workitem descriptions, and other description information. Each level of code unit may have different applicable types of description unit. For example, at the organization 102 or project 104 levels, there may not be actual code information, code comments, or commit logs.

As noted above, each description unit may be weighted, with an exemplary default weight of 1.0. These weights may then be updated based on user feedback, tuning the contributions of different types of description units. In different projects, the quality of specific description sources may vary. In this case, weights are set for each different type of description source. If a type of description source (e.g., commit logs) are known to have low quality in the project in question, the weight for that type of description source may be set to a lower weight.

Figure 2:
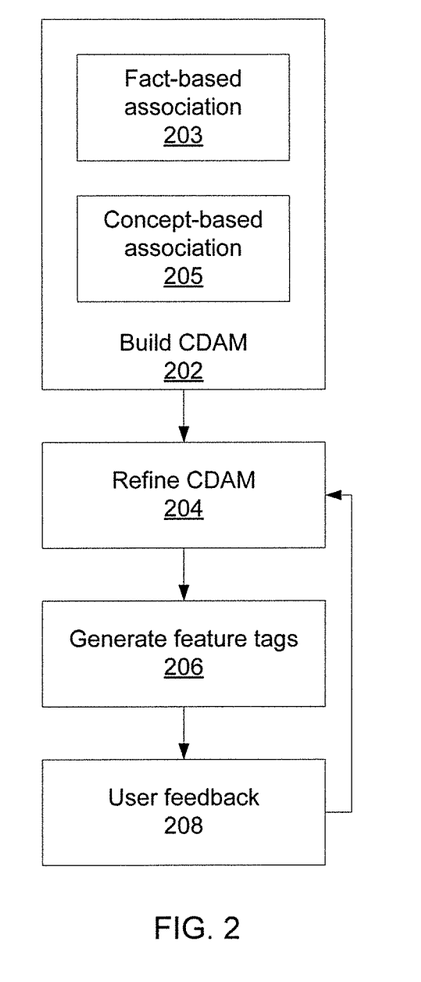
FIG. 2 is a block/flow diagram of a method for feature tagging in source code in accordance with the present principles.

Referring now to FIG. 2, a method for using a CDAM to tag features is shown. Block 202 builds the CDAM, associating description units and other information sources with code units in different layers. Block 202 includes both fact-based association 203 and concept-based association 205. Block 204 then filters the CDAM by filtering unmeaningful descriptive units through cross-validation and the consideration of user feedback. Block 206 uses cross-validation to generate feature tags among different layers of the remaining description units. In block 208, users review the feature tags and provide feedback, which is provided back to block 204 for refining the CDAM.

This feedback is obtained from users regarding which code units are correct and fulfill their needs. Based on such feedback, the weights of the different sources of description units are recalculated. For example, if a first source of description units contributes more meaningful concepts for helping the identification of the correct code units, block 204 can increase the weights of description units from that source. Based on the updated weights, block 204 executes CDAM refinement again to improve the effectiveness of the CDAM.

Figure 3:
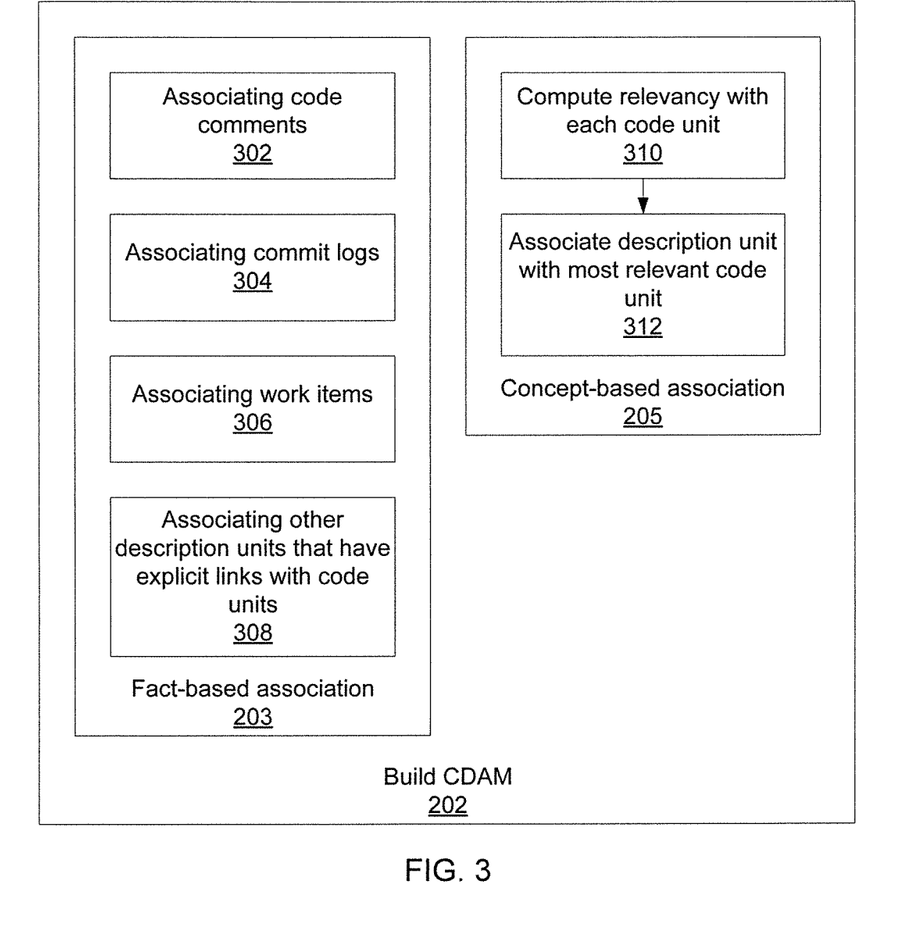
FIG. 3 is a block/flow diagram of a method for building a CDAM in accordance with the present principles.

Referring now to FIG. 3, additional detail on block 202 is shown. Fact-based association block 203 associates code comments in block 302 (e.g., based on comment locations), commit logs in block 304 (e.g., based on code changes introduced by commits and any notes made by the programmer), work items in block 306 (e.g., based on associated commits of work items), and any other descriptive units that have explicit links with code units in block 308.

Concept-based association block 205 then computes, for description units that don't have explicit links to code units, a relevancy between each such description unit and each code unit in block 310. This may include an average value of similarity values between each description unit and each already-associated description unit of each code unit. Thus, if an un-associated description unit has certain keywords in common with an already-associated description unit (or is by any other metric highly similar to the already-associated description unit), then the un-associated description unit may be associated with the same code unit as is associated with the highly similar description unit in block 312.

As a result of each of blocks 203 and 205, as many description units are associated with code units as possible. Not all of the associations will be particularly relevant, which necessitates some form of trimming or refinement, as discussed below. For those description units that are not explicitly associated in block 203, block 205 attempts to tie their information to a code unit.

Figure 4:
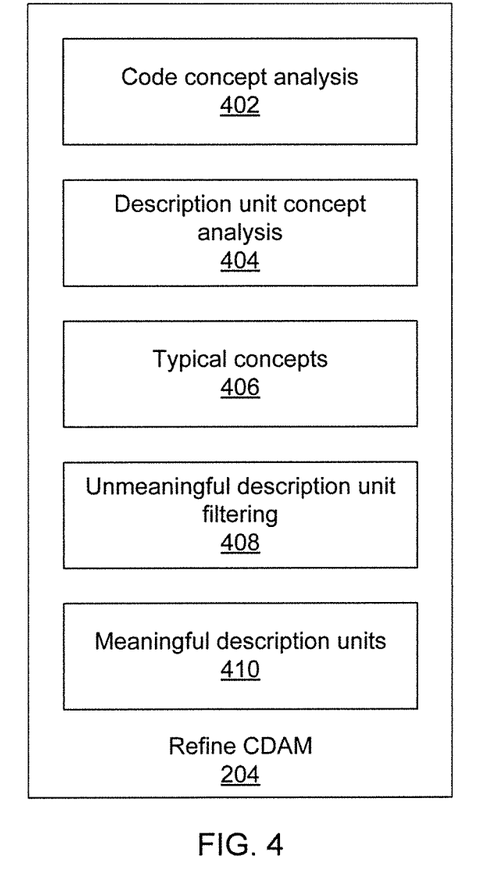
FIG. 4 is a block diagram of a method of refining a CDAM in accordance with the present principles.

Referring now to FIG. 4, additional detail is shown for refining the CDAM in block 204. The code information of a given code unit is extracted based on actions and entities in the code unit by block 402. The actions and entities extracted by block 402 are keywords for helping people understand the feature the code unit is implementing. The description units of the code unit are then extracted in block 404, which may, for example, extract a top percentage (e.g., 10%) of actions and entities across units. Block 404 applies, e.g., natural language processing metrics to identify top actions and entities among multiple already-associated description units of a code unit. These top actions and entities are also usually keywords for aiding in understanding the feature the code unit is implementing. All of such collected keywords are the "typical concepts" in block 406.

Block 408 filters out unmeaningful description units. To accomplish this, block 408 looks for description units that include at least one level-relevant concept. For example, if a code unit in question is a class unit 106, block 408 looks for description units that have at least one class-level concept. All description units that lack a level-relevant concept are filtered out, leaving only the meaningful description units in block 410. In this context, a "concept" is a descriptive word or phrase for a code unit defined by its description units. Meaningful concepts are words or phrases which can specifically present one characteristic of code. For example, some common words or jargon will not be meaningful concepts. Class-level concepts usually come from class-level description units.

Figure 5:
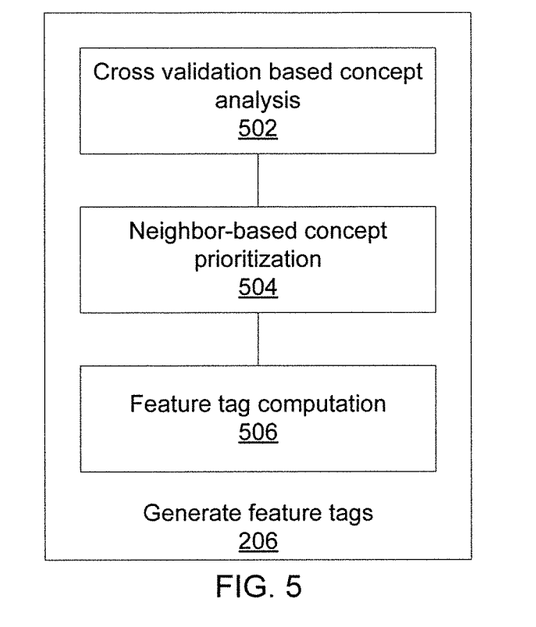
FIG. 5 is a block/flow diagram of a method of generating feature tags in accordance with the present principles.

Referring now to FIG. 5, additional detail on the generation of feature tags in block 206 is shown. Block 502 performs cross-validation-based concept analysis by performing a weighted sum of term frequencies, which represent the occurrence frequency of concepts in the description units associated with a code unit. The weighted sum adds each weighted term frequency in each description unit together for a concept. The sum is performed across all description units associated with the code unit, thereby establishing cross validation. The concept analysis is performed for each code unit. Block 504 performs neighbor-based concept prioritization. Block 506 computes tag features.

Neighbor-based concept prioritization in block 504 uses concepts from adjacent levels to adjust a given concept ranking. For example, if a method unit 108 is being analyzed, concepts from the class unit 106 above it and any callee method units 110 below it are also considered. This may include promoting concepts that are present in lower neighbors and degrading concepts that are present in higher neighbors to produce a finalized, prioritized set of concepts for the code unit in question. Alternatively, concepts from lower neighbors may be degraded and concepts from upper neighbors may be enhanced. Promotion is usually performed when, e.g., all of the children units of a given code unit have the same concept, and that concept is promoted from the children to the parent. Degradation, meanwhile, is usually performed when some of the child code units have the same concept as the parent concept, such that the concept is degraded from the parent code unit to these children code units.

For each code unit, block 506 finds its top N prioritized concepts and generates action-entity pairs, where "actions" are action concepts and usually are verbs and "entities" are entity concepts and usually are nouns. To generate an action-entity pair, the action concept is identified and then its subject entity concept is located in a sentence, which shows that the two are semantically relevant. For each pair, it is determined whether each element of the pair occurs in a single sentence among the description units associated with the code unit. If so, and if the action and the entity are semantically relevant, block 506 computes the semantic relevance using semantic analysis and computes a ranking score as, for example, relevancy multiplied by the description unit's weight. Block 506 then selects the top N action-entity pairs based on their ranking scores and assigns them as feature tags of the code unit.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 6:
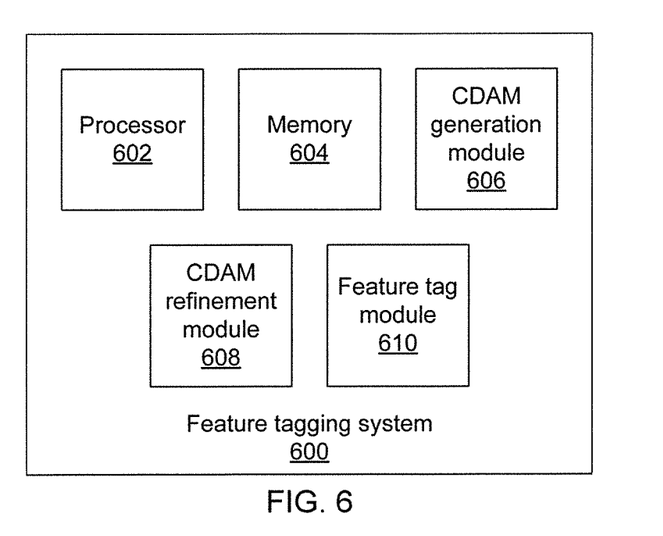
FIG. 6 is a block diagram of a system for feature tagging in source code in accordance with the present principles.

Referring now to FIG. 6, a feature tagging system 600 is shown. The system 600 includes a hardware processor 602 and a memory 604. It should be noted that the system includes a set of functional modules as well. These modules may be implemented as software running on the hardware processor 602 or may, alternatively, be implemented in hardware as, for example, one or more application specific integrated chips or field programmable gate arrays. A CDAM generation module 606 builds a CDAM hierarchy and associates respective description units with each code unit. A CDAM refinement module 608 improves the CDAM by filtering un-meaningful descriptive units through cross-validation and the consideration of user feedback. A feature tag module 610 then uses the refined CDAM to generate a set of feature tags that associate specific portions of the source code of a program with specific functional features.

Having described preferred embodiments of cross-validation based feature tagging (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for tagging code, comprising:
organizing code units in a hierarchical structure that associates the code units with respective description units;
filtering the hierarchical structure to remove un-meaningful description units from the hierarchical structure; and
generating feature tags, using a processor, based on a weighted sum of term frequencies in the description units of the hierarchical structure to associate features with respective code units.

2. The method of claim 1, wherein organizing comprises performing fact-based association and concept-based association.

3. The method of claim 2, wherein performing fact-based association comprises associating code units with respective description units that have an explicit link to the code units.

4. The method of claim 2, wherein performing concept-based association comprises computing a relevancy between description units and code units for description units lacking explicit links to code units.

5. The method of claim 4, wherein performing concept-based association comprises associating each description unit lacking an explicit link with a most-relevant code unit.

6. The method of claim 1, wherein filtering the hierarchical structure comprises:
determining whether each given description unit has at least one level-relevant concept pertaining to a level of an associated code unit; and
filtering out all description units which lack at least one level-relevant concept.

7. The method of claim 1, wherein generating feature tags comprises promoting or degrading a concept in a code unit based on a presence of the concept in code units on neighboring levels in the hierarchical structure.

8. The method of claim 1, further comprising refining the hierarchical structure in accordance with user feedback.

9. The method of claim 1, wherein generating feature tags comprises:
determining semantically relevant action-entity pairs based on a set of concepts associated with each code unit; and
selecting a set of N most relevant action-entity pairs to be used as feature tags of a respective code unit.

10. The method of claim 1, wherein the hierarchical structure is a tree structure, where code units of different levels of the tree structure are represented by different types of code unit.

11. A computer readable storage medium comprising a computer readable program for tagging code, wherein the computer readable program when executed on a computer causes the computer to perform the steps of:
organizing code units in a hierarchical structure that associates the code units with respective description units;
filtering the hierarchical structure to remove un-meaningful description units from the hierarchical structure; and
generating feature tags, using a processor, based on a weighted sum of term frequencies in the description units of the hierarchical structure to associate features with respective code units.

12. A feature tagging system, comprising:
a hierarchical structure generation module configured to organize code units in a hierarchical structure that associates code units with respective description units;
a refinement module configured to filter the hierarchical structure to remove un-meaningful description units from the hierarchical structure; and
a feature tag module comprising a processor configured to generate feature tags based on a weighted sum of term frequencies in the description units of the filtered hierarchical structure to associate features with respective code units.

13. The system of claim 12, wherein the hierarchical structure generation module is further configured to perform fact-based association and concept-based association.

14. The system of claim 13, wherein the hierarchical structure generation module is further configured to associate associating code units with respective description units that have an explicit link to the code units.

15. The system of claim 13, wherein the hierarchical structure generation module is further configured to compute a relevancy between description units and code units for description units lacking explicit links to code units.

16. The system of claim 15, wherein the hierarchical structure generation module is further configured to associate each description unit lacking an explicit link with a most-relevant code unit.

17. The system of claim 12, wherein the refinement module is further configured to determine whether each given description unit has at least one level-relevant concept pertaining to a level of an associated code unit and to filter out all description units which lack at least one level-relevant concept.

18. The system of claim 12, wherein the feature tag module is further configured to promote or degrade a concept in a code unit based on a presence of the concept in code units on neighboring levels in the hierarchical structure.

19. The system of claim 12, wherein the refinement module is further configured to refine the hierarchical structure in accordance with user feedback.

20. The system of claim 12, wherein the feature tag module is further configured to determine semantically relevant action-entity pairs based on a set of concepts associated with each code unit and to select a set of N most relevant action-entity pairs to be used as feature tags of a respective code unit.

* * * * *